US010218602B2

(12) United States Patent
Levy-Abegnoli et al.

(10) Patent No.: US 10,218,602 B2
(45) Date of Patent: Feb. 26, 2019

(54) ESTABLISHING DETERMINISTIC MULTICAST PATHS IN A NETWORK

(71) Applicant: Cisco Technology, Inc., San Jose, CA (US)

(72) Inventors: Eric Michel Levy-Abegnoli, Valbonne (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 14/816,108

(22) Filed: Aug. 3, 2015

(65) Prior Publication Data
US 2016/0308793 A1   Oct. 20, 2016

Related U.S. Application Data

(60) Provisional application No. 62/147,787, filed on Apr. 15, 2015.

(51) Int. Cl.
*H04L 12/761* (2013.01)
(52) U.S. Cl.
CPC .................................. *H04L 45/16* (2013.01)
(58) Field of Classification Search
CPC ..... H04L 67/1095; H04L 45/12; H04L 45/00; H04L 45/16
See application file for complete search history.

(56) References Cited

U.S. PATENT DOCUMENTS

| 6,691,312 B1* | 2/2004 | Sen ........................ H04N 7/165 348/E5.008 |
| 7,519,733 B1 | 4/2009 | Thubert et al. |
| 8,228,931 B1* | 7/2012 | Wallace ............. H04L 12/5696 370/428 |
| 8,711,752 B2 | 4/2014 | Liu et al. |
| 8,724,533 B2 | 5/2014 | Thubert et al. |
| 2003/0174652 A1* | 9/2003 | Ebata ...................... H04L 45/00 370/235 |

(Continued)

OTHER PUBLICATIONS

Gunther, Ed., "Deterministic Networking Professional Audio Requirements", [online], Mar. 31, 2015, [retrieved on Jun. 24, 2015]. Retrieved from the Internet: <URL: https://tools.ietf.org/html/draft-gunther-detnet-proaudio-req>, pp. 1-12.

(Continued)

*Primary Examiner* — Noel R Beharry
*Assistant Examiner* — Nicole King
(74) *Attorney, Agent, or Firm* — Leon R. Turkevich

(57) ABSTRACT

In one embodiment, a method comprises identifying, by an apparatus in a deterministic network, a multicast forwarding tree comprising a single multicast source as a root of the multicast forwarding tree, a plurality of terminal destination devices as respective leaves of the multicast forwarding trees, and forwarding network devices configured for forwarding a message, transmitted by the root, to the terminal destination devices; and causing, by the apparatus, the forwarding network devices to deliver the message to each of the terminal destination devices simultaneously at a same arrival time.

20 Claims, 8 Drawing Sheets

(56) References Cited

U.S. PATENT DOCUMENTS

| | | | |
|---|---|---|---|
| 2004/0136370 A1* | 7/2004 | Moore | H04L 12/5693 370/389 |
| 2012/0275301 A1* | 11/2012 | Xiong | H04L 49/357 370/230 |
| 2014/0233422 A1 | 8/2014 | Thubert et al. | |

OTHER PUBLICATIONS

Thubert, Ed., "An Architecture for IPv6 over the TSCH mode of IEEE 802.15Ae", [online], Oct. 27, 2014, [retrieved on Jan. 21, 2015]. Retrieved from the Internet: <URL: http://tools.ietf.org/pdf/draft-ietf-6tisch-architecture-04.pdf>, pp. 1-31.

Vilajosana, Ed., "Minimal 6TiSCH Configuration", [online], Jan. 6, 2015, [retrieved on Jan. 21, 2015]. Retrieved from the Internet: <URL: https://tools.ietf.org/pdf/draft-ieff-6tisch-minimal-05.pdf>, pp. 1-22.

Palattella, Ed., "Terminology in IPv6 over the TSCH mode of IEEE 802.15.4e", [online], Jan. 8, 2015, [retrieved on Jan. 21, 2015]. Retrieved from the Internet: <URL: https://tools.ietf.org/pdf/draft-ieff-6tisch-terminology-03.pdf>, pp. 1-14.

Watteyne, Ed., "Using IEEE802.15.4e TSCH in an IoT context: Overview, Problem Statement and Goals", [online], Jan. 8, 2015, [retrieved on Jan. 21, 2015]. Retrieved from the Internet: <URL: https://tools.ietf.org/pdf/draft-ietf-6tisch-tsch-05.pdf>, pp. 1-21.

Schmidt et al., "Seamless Multicast Handover in a Hierarchical Mobile IPv6 Environment (M-HMIPv6)", [online], Nov. 2005, [retrieved on Jun. 24, 2015]. Retrieved from the Internet: <URL: https://tools.ietf.org/pdf/draft-schmidt-waehlisch-mhmipv6-04.pdf>, pp. 1-17.

Yen, et al., "A hierarchical architecture for buffer management in integrated services networks", [online], Multimedia Systems, 1996, [retrieved on Jun. 24, 2015]. Retrieved from the Internet: <URL: http://www.ece.gatech.edu/research/labs/bwn/papers/1996/j6.pdf>, vol. 4, pp. 131-139.

Wei, "Synchronous multicast and broadcast service in multi-rate IEEE 802.16j WiMAX relay network", [online] [retrieved on Jun. 24, 2015]. Retrieved from the Internet: <URL: http://www.researchgate.net/publication/220292384_Synchronous_multicast_and_broadcast_service_in_multi-rate_IEEE_802.16j_WiMAX_relay_network>, 2 pages.

Thubert et al., "IETF 6TSCH: Combining IPv6 Connectivity with Industrial Performance", 2013 IEEE, 2013 Seventh International Conference on Innovative Mobile and Internet Services in Ubiquitous Computing, XP_032485811A, pp. 541-546.

Vasseur, "Terms Used in Routing for Low-Power and Lossy Networks", Internet Engineering Task Force, Request for Comments: 7102, Jan. 2014, pp. 1-8.

* cited by examiner

INITIAL CONDITIONS,
600

MULTICAST ROUTING GRAPH
$t_0$: CURRENT TIME ON ROOT, TARGET ARRIVAL TIME: $t_A$
$i$: CURRENT NODE, $P^i$: PARENT OF $i$, $C^i$: FORWARDING CHILDREN OF $i$
$u = t_a(i)$: ARRIVAL TIME AT $i$, $v = t_d(i)$: DEPARTURE TIME FROM $i$
$v_k = t_d(i,k)$: DEPARTURE TIME FROM $i$ TO $k$
$tr_0$: TRAVEL TIME ON ONE SEGMENT
$b_i[u,v]$: #FREE BUFFERS AT NODE $i$ DURING TIME INTERVAL $[u,v]$

FIG. 6

ESTABLISHING DETERMINISTIC MULTICAST PATHS IN A NETWORK

This application claims priority to U.S. Provisional Application No. 62/147,787, filed Apr. 15, 2015.

TECHNICAL FIELD

The present disclosure generally relates to computer networks, and more particularly to establishing deterministic multicast paths in a network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. The tracks which are used by the different trains also may be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

Reference is made to the attached drawings, wherein elements having the same reference numeral designations represent like elements throughout and wherein:

FIG. 6 illustrates an example set of initial conditions for establishing deterministic multicast paths in a multicast forwarding tree, according to an example embodiment.

DESCRIPTION OF EXAMPLE EMBODIMENTS

Overview

Figure 1:
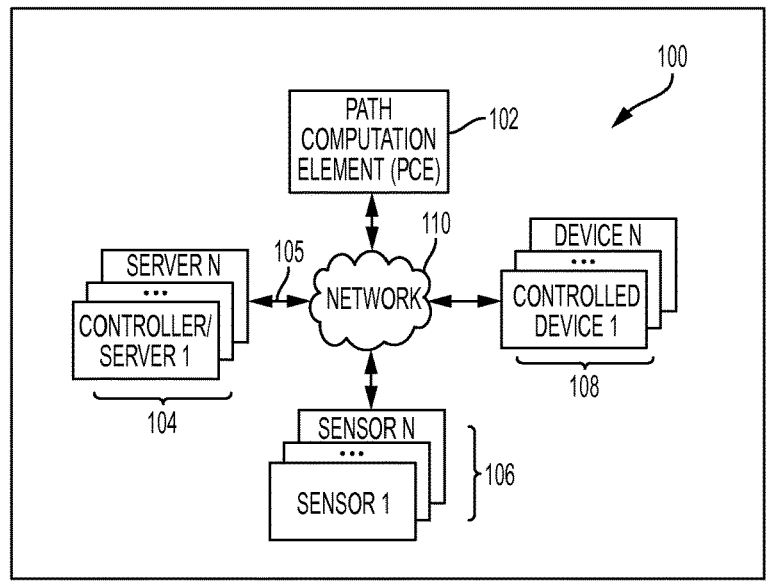
FIG. 1 illustrates an example deterministic communication network having an apparatus for establishing deterministic multicast paths in the communication network, according to an example embodiment.

In one embodiment, a method comprises identifying, by an apparatus in a deterministic network, a multicast forwarding tree comprising a single multicast source as a root of the multicast forwarding tree, a plurality of terminal destination devices as respective leaves of the multicast forwarding tree, and forwarding network devices configured for forwarding a message, transmitted by the root, to the terminal destination devices; and causing, by the apparatus, the forwarding network devices to deliver the message to each of the terminal destination devices simultaneously at a same arrival time.

In another embodiment, an apparatus comprises a processor circuit and an interface circuit. The processor circuit is configured for identifying, in a deterministic network, a multicast forwarding tree comprising a single multicast source as a root of the multicast forwarding tree, a plurality of terminal destination devices as respective leaves of the multicast forwarding tree, and forwarding network devices configured for forwarding a message, transmitted by the root, to the terminal destination devices. The processor circuit further is configured for generating instructions causing the forwarding network devices to deliver the message to each of the terminal destination devices simultaneously at a same arrival time. The interface circuit is configured for sending, to the forwarding network devices, the instructions causing the forwarding network devices to deliver the message to each of the terminal destination devices simultaneously at a same arrival time.

In another embodiment, one or more non-transitory tangible media are encoded with logic for execution by a machine and when executed by the machine operable for: identifying, by the machine implemented as an apparatus in a deterministic network, a multicast forwarding tree comprising a single multicast source as a root of the multicast forwarding tree, a plurality of terminal destination devices as respective leaves of the multicast forwarding tree, and forwarding network devices configured for forwarding a message, transmitted by the root, to the terminal destination devices; and causing, by the apparatus, the forwarding network devices to deliver the message to each of the terminal destination devices simultaneously at a same arrival time.

DETAILED DESCRIPTION

Particular embodiments enable the establishment of deterministic multicast paths in a deterministic network based on scheduling of a message (i.e., a data packet) using a multicast forwarding tree, where the scheduling of network devices (based on instructions sent to the network devices) ensures that the message output by a root of the multicast forwarding tree is delivered to each terminal destination device (i.e., leaf of the multicast forwarding tree) at a same arrival time. Hence, the terminal destination devices are guaranteed to receive the message simultaneously at the same arrival time. The delivery of the message to all the terminal destination devices at the same arrival time is particularly effective in industrial applications requiring strict synchronization, security applications, etc.

Additional embodiments enable the scheduling of network devices to be executed based on a controller (e.g., a Path Computation Element (PCE)) generating a multicast routing graph that identifies transmission schedules for the root and forwarding network devices in the multicast forwarding tree, based on the relative buffer capacity of the forwarding network devices. In one example, the PCE can generate a multicast routing graph that specifies a "downstream" buffering for execution by the forwarding network devices, where the "downstream" buffering maximizes buffering of the message in penultimate nodes having next-hop connections with the terminal destination devices: the "downstream" buffering enables each penultimate node to store the message as long as necessary until the prescribed arrival time.

In another example, the PCE can generate a multicast routing graph that specifies an "upstream" buffering for execution by the forwarding network devices, where the "upstream" buffering minimizes buffering of the message in the penultimate nodes and maximizes buffering of the message in parent nodes closest to the root: the "upstream" buffering enables the delay of transmission through the multicast forwarding tree as long as possible.

Hence, the PCE can guarantee the simultaneous delivery at the same arrival time, to each of the terminal destination devices, based on generating the multicast routing graph relative to the topology of the multicast forwarding tree and the relative buffer capacity of each of the forwarding network devices in the multicast forwarding tree.

A description will first be provided of the infrastructure for implementing the deterministic network that comprises the multicast forwarding tree, followed by a detailed description of the PCE establishing deterministic multicast paths that causes the forwarding network devices of the multicast forwarding tree to deliver the message to each terminal destination device simultaneously at the same arrival time.

Deterministic Network

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer system 100 illustratively comprising network nodes (i.e., network devices) 200 (e.g., labeled as shown, "controller(s)/server(s) 104," "path computation element (PCE) 102," "sensor(s) 106," and "controlled device(s) 108" and described below) interconnected by various methods of communication. For instance, the links 105 may be wired links or shared media (e.g., wireless links, PLC links, etc.) where certain nodes 200 may be in communication with other nodes 200, e.g., based on distance, signal strength, current operational status, location, etc., via a network 110. Any number of nodes, devices, links, etc. may be used in the computer network, and that the view shown herein is for simplicity. While the network is shown in a certain orientation, system 100 is merely an example illustration that is not meant to limit the disclosure.

Data packets (e.g., traffic and/or messages sent between the devices/nodes) may be exchanged among the nodes/devices of the computer system 100 using predefined (i.e., prescribed) network communication protocols such as certain known wired protocols, wireless protocols (e.g., IEEE Std. 802.15.4, WiFi, Bluetooth®, etc.), PLC protocols, or other shared-media protocols where appropriate. In this context, a protocol comprises a set of rules defining how the nodes interact with each other.

According to various embodiments, network 110 may be, or may include, a Low Power and Lossy Network (LLN). LLNs (e.g., certain sensor networks), may be used in a myriad of applications, such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnections are constrained: LLN routers typically operate with constraints, e.g., processing power, memory, and/or energy (battery), and their interconnections are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" can refer to uniquely identifiable objects (things) and their virtual representations in a network-based architecture. In particular, IoT extends interconnection of devices in the Internet beyond connections computers and communications devices: IoT extends Internet-based connectivity to "objects" or "things" in general, such as lighting elements and/or lighting fixtures, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 2:
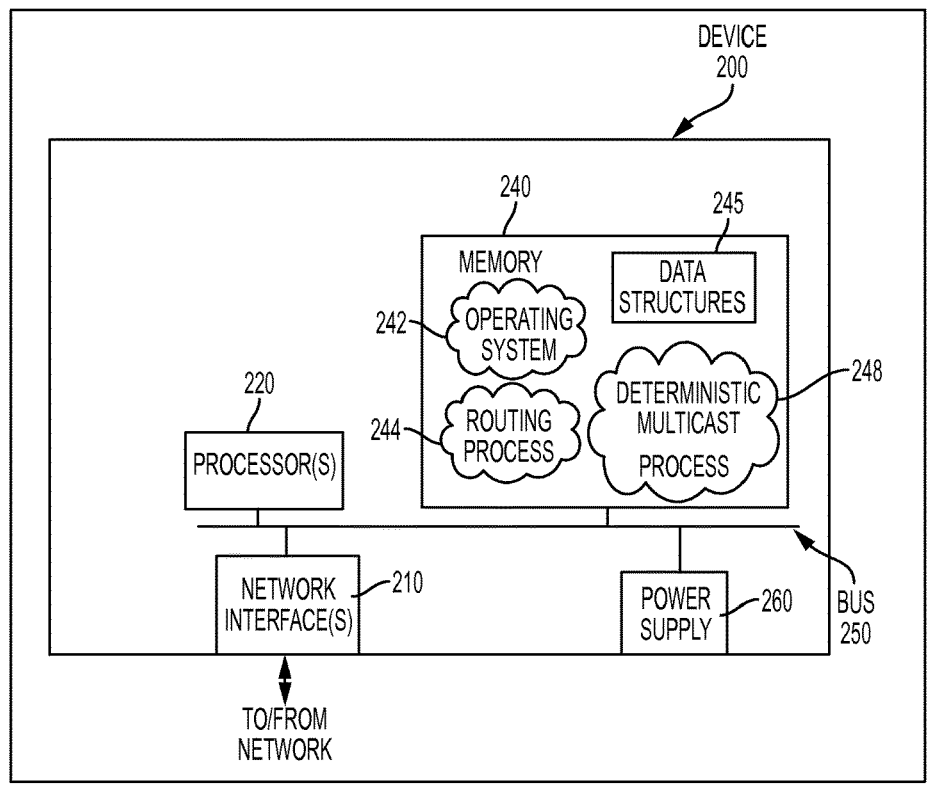
FIG. 2 illustrates an example network device/node, according to an example embodiment.
Figure 3A:
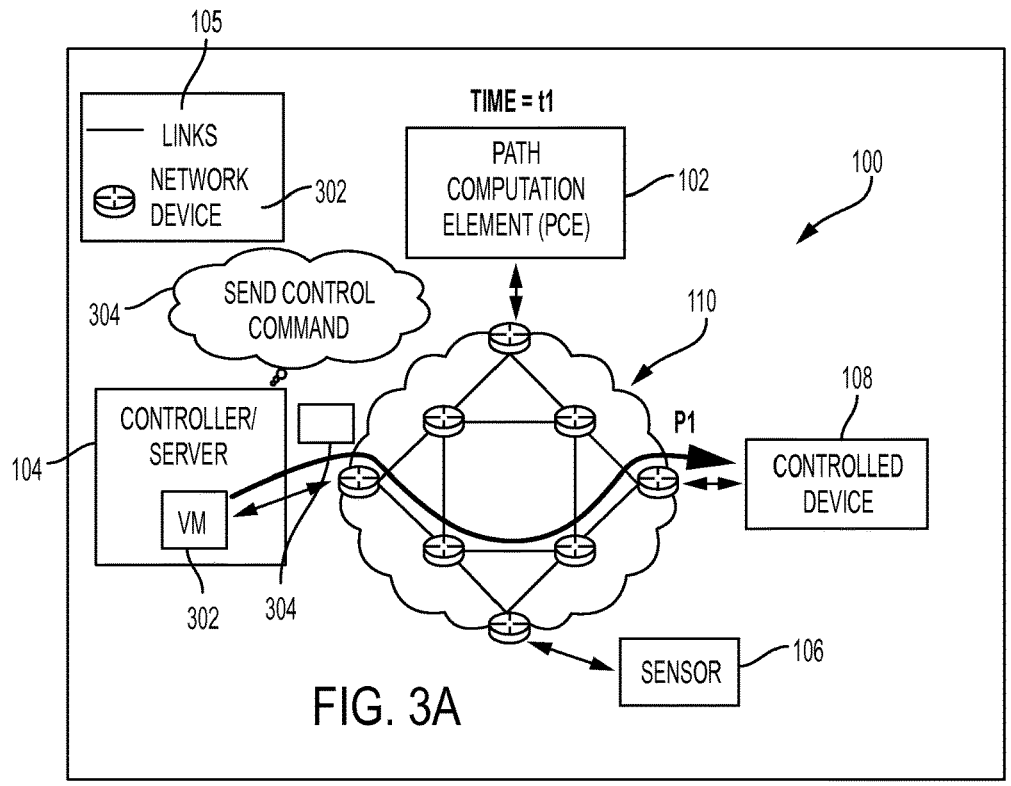
FIGS. 3A-3D illustrate an example control loop in the communication network of FIG. 1, according to an example embodiment.
Figure 3B:
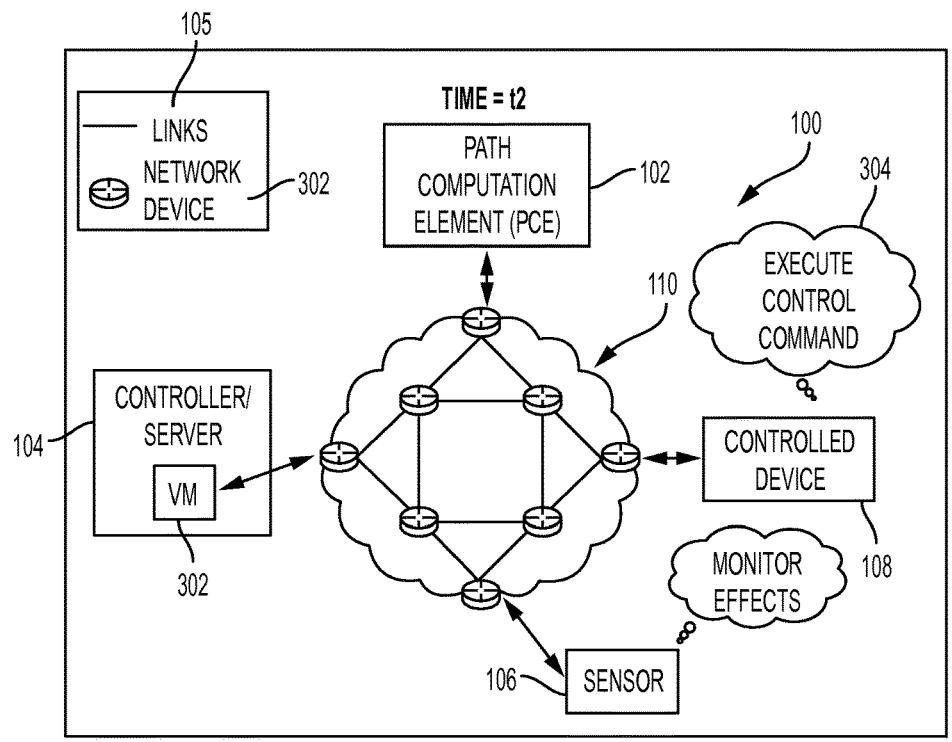
Figure 3C:
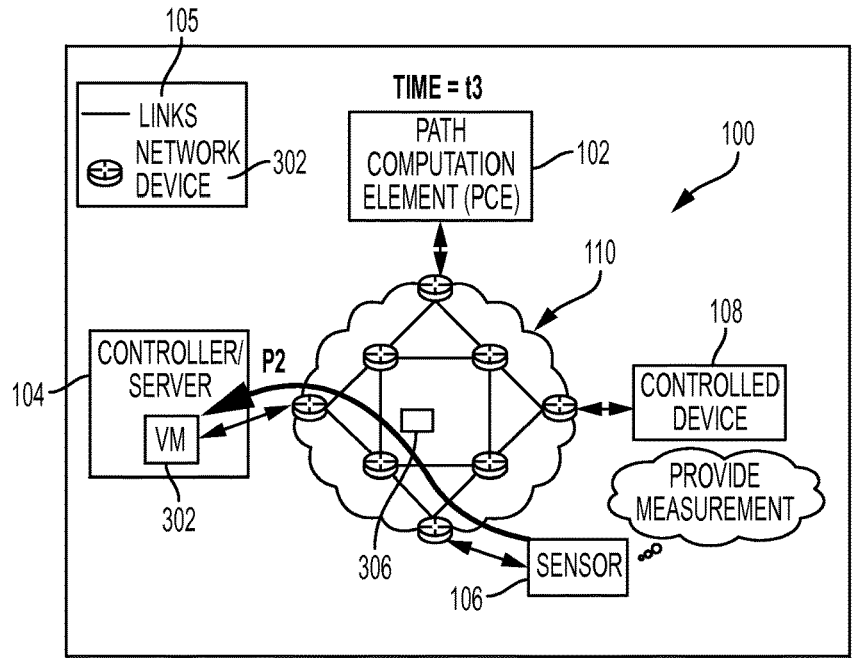
Figure 3D:
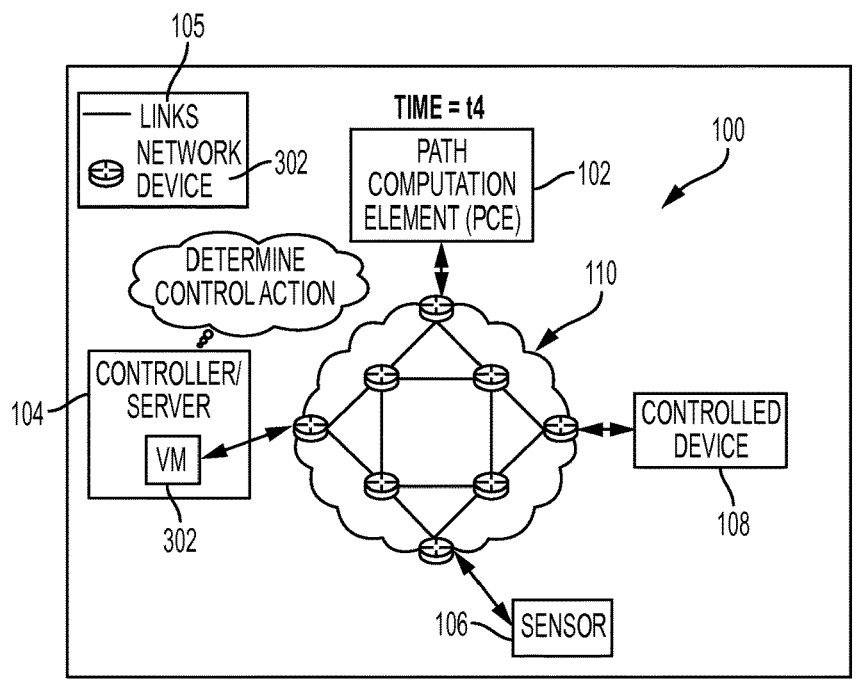
Figure 4:
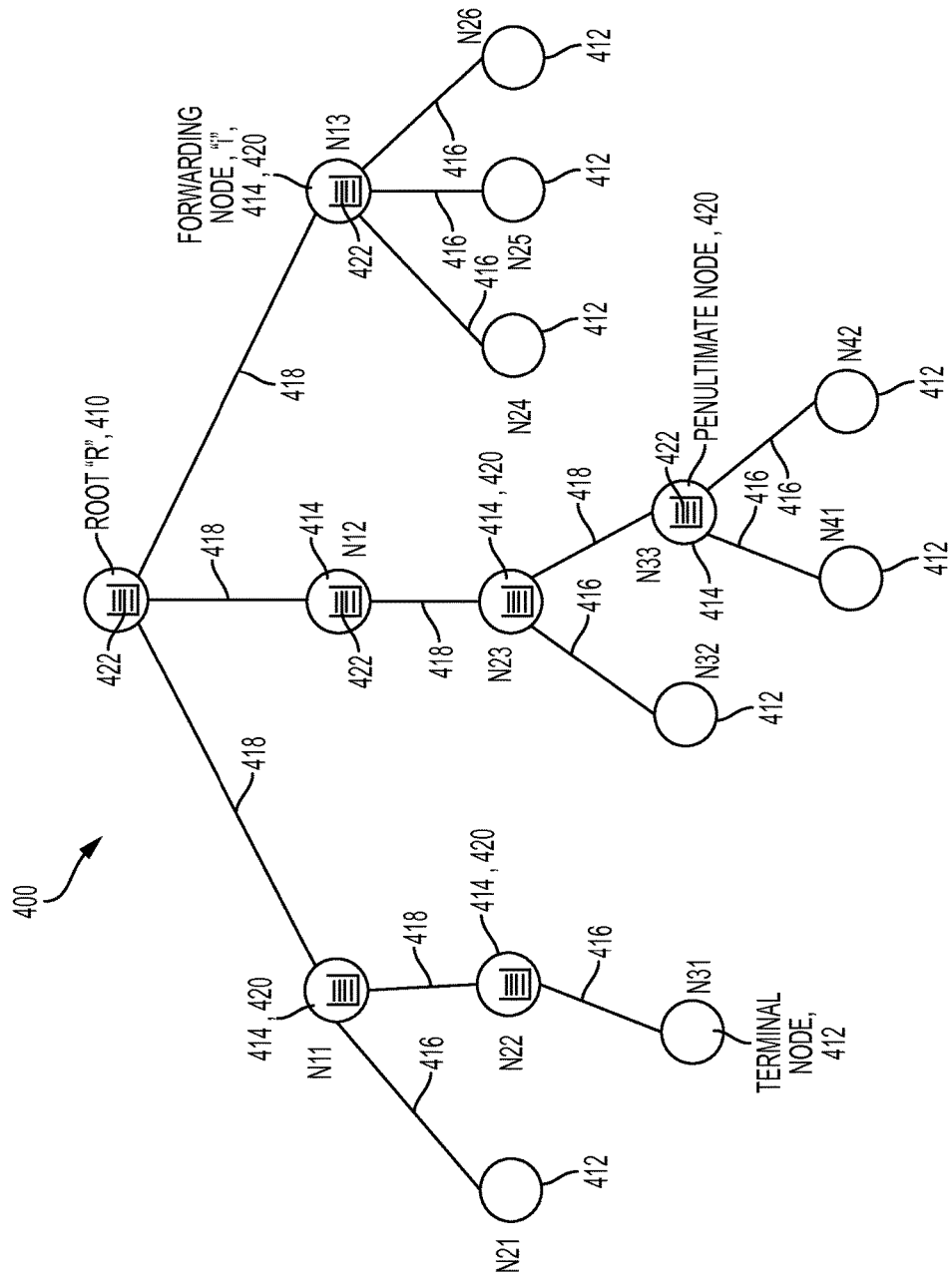
FIG. 4 illustrates an example multicast forwarding tree established in the deterministic communication network of FIG. 1, according to an example embodiment.

FIG. 2 is a schematic block diagram of an example node/device 200 that may be used with one or more embodiments described herein, e.g., as any of the nodes/devices shown in FIG. 1 above, or any of the nodes/devices of FIGS. 3A-3D and/or FIG. 4, including the devices 102, 104, 106, 108, 200, 410, 412, 414, 414. The device 200 may comprise one or more network interface circuits 210 (e.g., wired, wireless, PLC, etc.), at least one processor circuit 220, and a memory circuit 240 interconnected by a system bus 250, as well as a power supply 260 (e.g., battery, plug-in, etc.).

The network interface circuit(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 105, e.g., wireless and wired/physical connections, and that the view herein is merely for illustration. Also, while the network interface circuit 210 is shown separately from power supply 260, for PLC the network interface circuit 210 may communicate through the power supply 260, or may be an integral component of the power supply. In some specific configurations the PLC signal may be coupled to the power line feeding into the power supply.

The memory circuit 240 comprises a plurality of storage locations that are addressable by the processor circuit 220 and the network interface circuits 210 for storing software programs and data structures associated with the embodiments described herein. Note that certain devices may have limited memory or no memory (e.g., no memory for storage other than for programs/processes operating on the device and associated caches). The processor circuit 220 may comprise hardware elements or hardware logic adapted to execute the software programs and manipulate the data structures 245. An operating system 242, portions of which are typically resident in memory circuit 240 and executed by the processor, functionally organizes the device by, inter alia, invoking operations in support of software processes and/or services executing on the device. These software processes/services may comprise routing process 244 and/or a deterministic multicast process 248, as described herein. Note that while processes 244 and 248 are shown in centralized memory circuit 240, alternative embodiments provide for these processes to be specifically operated within the network interface circuits 210, such as a component of a MAC layer.

Other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, the processes may be routines or modules within other processes.

Routing process (services) 244 include computer executable instructions executed by the processor circuit 220 to perform functions provided by one or more routing protocols, such as proactive or reactive routing protocols. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

An example routing protocol that is particularly suited for LLN applications and may be supported by routing process 244 is specified in an Internet Engineering Task Force (IETF) Request for Comment (RFC) 6550, entitled "RPL: IPv6 Routing Protocol for Low Power and Lossy Networks". RFC 6550 provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) for use in routing packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Deterministic multicast process 248 may include instructions executable by processor circuit(s) 220 that work in conjunction with routing process 244 to provide deterministic multicasting within the network. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion (e.g., by routing processes 244), but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), which is referred to herein as "6TiSCH". The centralized computation is typically done by an orchestrator/PCE (e.g., PCE 102) with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol. The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Referring now to FIGS. 3A-3D, an example control loop in the communication network of FIG. 1 is shown, according to various embodiments. In FIG. 3A, a controller/server 104 may send a control command 304 to a controlled device 108 at a time T=t1 along a network path P1 via any number of intermediary/forwarding network devices 302 (e.g., devices 200 such as other controlled devices, routers, switches, sensors, etc.). In various embodiments, control command 304 may be sent in accordance with a communication schedule and/or routing path, as determined by PCE 102. For example, assume that controlled device 108 is an actuator, or includes an actuator, that opens or closes a damper. In such a case, control command 304 may instruct controlled device 108 to open or close the damper by a specified amount. In some embodiments, as shown, control command 304 may be generated by a virtual machine (VM) 302 that executes a control application for controlled device

108. In other embodiments, control command 304 may be generated by a non-virtualized controller (e.g., a programmable logic controller, etc.).

In FIG. 3B, the controlled device 108 executes control command 304 at a time T=t2. Continuing the above example, this may correspond to controlled device 108 opening a damper or performing any other controlled operation. Notably, the time difference between t1 and t2 may be a function of the transmission time along path P1 for control command 304 to reach controlled device 108. In some cases, one or more sensors 106 may also monitor the effects of the executed control command 304. For example, opening a damper may change an air temperature that is monitored by sensors 106. In various embodiments, sensor(s) 106 may be separate devices from that of controlled device 108 or integrated therein.

In FIG. 3C, sensor(s) 106 may provide measurement data 306 to controller/server 104 at a time T=t3. Measurement data 306 may include any raw measurements regarding the effects of controlled device 108 executing control command 304 and/or any calculated values derived therefrom (e.g., statistics, computations, etc.). In various embodiments, measurement data 306 may be communicated at a specific time, in accordance with a communication schedule assigned to sensor 106 (e.g., by PCE 102). In some cases, measurement data 306 may be communicated to controller/server 104 along the same path as control command 304, such as when sensor(s) 106 are integrated into controlled device 108. In other embodiments, measurement data 306 may be provided to controller/server 104 along a separate path P2 that traverses different intermediary devices within network 110.

In FIG. 3D, controller/server 104 may determine a control action at a time T=t4 based on the received measurement data 306. For example, if the air temperature measured by sensor 106 is a function of a damper that is actuated by controlled device 108, controller may use the measured temperature to determine whether further adjustments to the damper are needed. Said differently, controller/server 104, controlled device 108, and sensor(s) 106 may operate as part of a control loop that functions to regulate the air temperature via control of a damper.

As noted above, deterministic networking refers to networks that can guarantee the delivery of packets within a bounded time. This translates in the following characteristics/requirements for the network: 1) a guarantee of delivery, 2) fixed latency, 3) and jitter close to zero (e.g., microseconds).

Various techniques may be used to ensure determinism in a network. In one case, the network may use quality of service (QoS) and 802.1Q mechanisms, to provide determinism. However, these mechanisms tend to fail rapidly. In another cases, the network may use scheduling techniques, such as peristaltic techniques or time scheduled techniques, to provide determinism. Both methods may be used for Ethernet or wireless technologies. In another case, a hybrid approach may be taken that combines QoS technologies with scheduling (e.g., the emission of packets on the different QoS queues is triggered by a schedule based gate mechanism). This approach is currently the only solution that effectively provides hard guarantees since over capacity provisioning can only help in some ways, without avoiding queuing in the presence of a burst of traffic that would unavoidably lead to delays.

Deterministic Ethernet or Deterministic Wireless based on a time-scheduled mechanism requires that all the nodes that are part of the path to be time synchronized. The Network Time Protocol (NTP) and Precision Time Protocol (PTP) are examples of technologies used to ensure time distribution among all the nodes. In some cases, the degree of precision needed may approach the microsecond level for Ethernet based communications. Each packet forwarding operation is then regulated by a time schedule that specifies when this specific packet has to be transmitted to the wire or the radio and this for each node on the path. This specific time period is called a time slot.

An external agent (often called the orchestrator or PCE) may perform the computation of the forwarding path and the associated timetable. Such a model is similar to a PCE used in multiprotocol label switching (MPLS) network to compute Traffic Engineering Label Switch Path, with the major difference being that a time schedule may be provided by the orchestrator instead of simply a constrained shortest path (e.g., the path in this example being both the path between physical nodes and the timetable associated with each flow). When the computation is done, the path and the timetable are then downloaded on every node participating to the forwarding, which in turn start receive and transmit packets according to the computed time schedule. For example, as shown in FIG. 3A, orchestrator/PCE 102 may compute path P1 and associated timetables, and download the path and timetable to the nodes participating in the forwarding. In some cases, the overall scheduling may also take into account the network part and the application computation components (e.g., transmission times, processing delays by intermediary nodes, etc.). In some instances, the scheduling/routing mechanism may be executed in a partially or fully distributed computing environment, such as in a data center or fog computing environment.

Deterministic multicasting may be suitable for certain networking situations. For example, robots are becoming more and more sophisticated in the industrial automation industry and the coordination between robots is now critical. On such an assembly chain, this coordination may be achieved through the application layer by sending deterministic multicast traffic. In other words, deterministic multicasting may allow a command to be received by several instruments (e.g. coordinated robots or robot components) at the exact same time in a multicast group. Another use case is the bank money transaction model. The time when money is effectively transferred from one institution to another is critical and the requirements on the network may be considerably large. When an operation implies several organisms, the use of deterministic multicast traffic will here also simplify the model and guarantee the exact timing when the transfer is done.

Providing deterministic multicasting in a network is not without challenges. In particular, the multicast traffic must be optimized in term of when to send a packet along the multicast forwarding tree. In addition, the traffic must also be buffered correctly across the intermediary devices, to ensure that the ultimate deliveries to the destinations happen at the same time, without clogging the buffers of any intermediate router. In certain types of network (e.g., LLNs, wireless network, etc.), resources also may be highly constrained, e.g., in terms of buffer memories, energy to transmit packets, etc.

Establishing Deterministic Multicast Paths in a Network

In some embodiments, the techniques herein allow for the use of deterministic multicasting in networks such as industrial wireless sensor networks based on 6TiSCH or other networks in which node resources are constrained. Various techniques are introduced herein that allow for a multicast message to be delivered simultaneously to multiple destinations. In one technique, each node forwards the message to its children up to a penultimate node that hold the message just long enough to achieve simultaneous delivery at the same time to each of the terminal destination devices. In another technique, buffering shortages in the multicast forwarding tree may be resolved somewhere upstream in the tree, where there is room to perform the buffering.

Specifically, according to one or more embodiments of the disclosure as described in detail below, the techniques herein provide for establishing deterministic multicast paths in a network.

Illustratively, the techniques described herein may be performed by hardware, software, and/or firmware, such as in accordance with the deterministic multicast process 248, which may include computer executable instructions executed by the processor 220 (or independent processor of interface circuits 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, consider the network 110 of FIG. 1 shown in greater detail in FIG. 4 as containing a multicast forwarding tree 400, according to various embodiments. The example multicast forwarding tree 400 comprises a root node 410, multiple terminal destination devices 412, and forwarding network devices 414. The multicast forwarding tree shown 400 may be computed in any number of different ways, according to the various multicast techniques available.

The root node (e.g., one of controllers 104, sensors 106, etc.) 410 is configured for sending a multicast message to multiple terminal destination devices (i.e., destinations, terminal nodes) 412 (e.g., multiple controllers 104, controlled devices 108, etc.) via i-number of forwarding network devices (i.e., forwarding nodes, intermediate nodes) 414 (e.g., intermediary nodes/devices 302). As shown, any forwarding network device 414 in the multicast forwarding tree 400 that is next to a terminal destination device 412 (i.e., that shares a terminal link 416 with a terminal destination device 412 as opposed to an intermediate link 418 with another forwarding network device 414 or the root node 410) also may be considered to be a "penultimate" node 420 for the terminal destination device 412, as described herein. Links 105 between the network nodes of the multicast forwarding tree 400 may be categorized as being either a "terminal" link (i.e., a link coupling a penultimate node 420 to a terminal destination device 412) 416 or an "intermediate link" (i.e., a link coupling a forwarding network device 414 to another forwarding network device 414 or the root node 410) 418.

Hence, the multicast forwarding tree 400 includes a root node "R" 410, terminal destination devices "N21", "N24", "N25", "N26", "N31", "N32", "N41", and "N42" 412, and forwarding network devices "N11", "N12", "N13", "N22", "N23", and "N33" 414. The forwarding network device "N11" 414 is a penultimate node 420 for the terminal network device "N21" 412; the forwarding network device "N22" 414 is a penultimate node 420 for the terminal network device "N31" 412; the forwarding network device "N23" 414 is a penultimate node 420 for the terminal network device "N32" 412; the forwarding network device "N33" 414 is a penultimate node 420 for the terminal network devices "N41" and "N42" 412; and the forwarding network device "N13" 414 is a penultimate node 420 for the terminal network devices "N24", "N25", and "N26" 412.

The forwarding network device "N12" 414 is not a penultimate node for any network device in the multicast forwarding tree 400, rather the forwarding network device "N12" 414 is a parent node for the forwarding node "N23" 414. Similarly, the forwarding network device "N11" 414 is a parent node for the forwarding node "N22" 414, and the forwarding network device "N23" 414 is a parent node for the forwarding node "N33" 414. As illustrated in FIG. 4, each of the forwarding nodes 414 and the root node 410 also have an available buffer capacity (i.e., free transmit buffer space) 422 for storing (i.e., queuing) one or more messages for transmission to a next-hop child node, via a terminal link 416 and/or intermediate link 418, according to a prescribed schedule established by the PCE 102.

Figure 5:
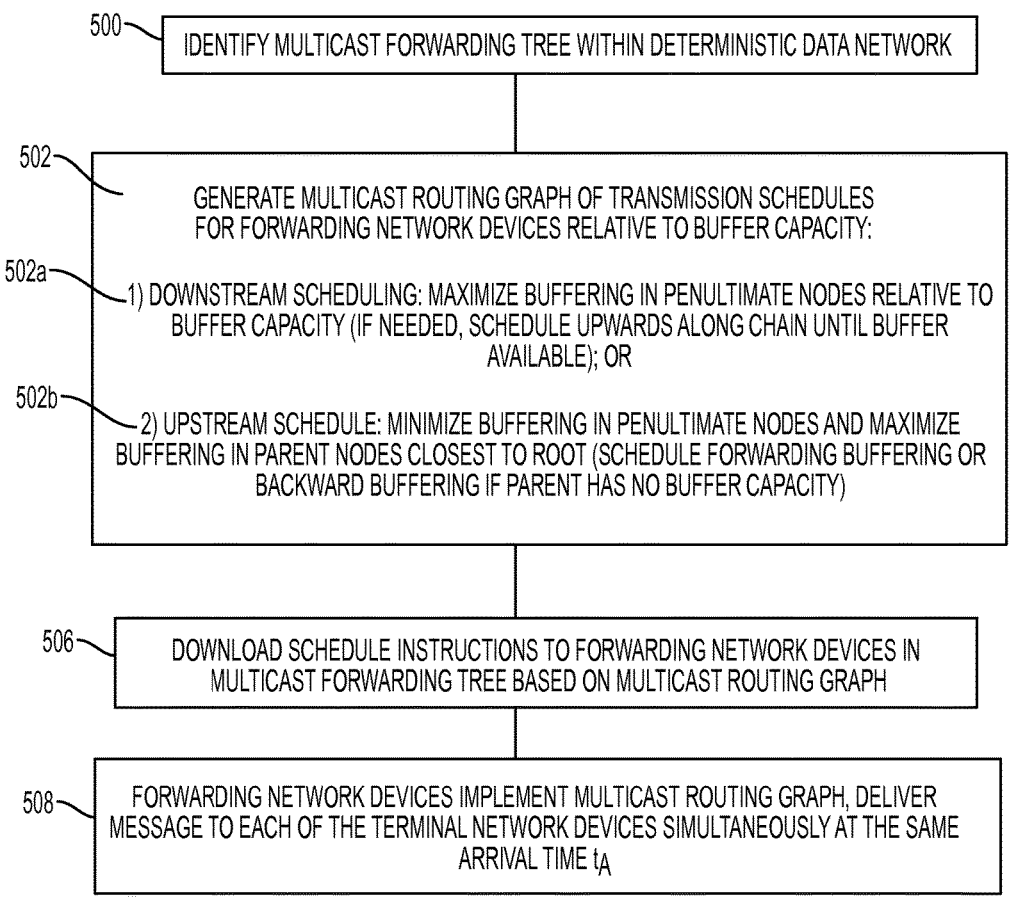
FIG. 5 illustrates an example method of establishing deterministic multicast paths in a multicast forwarding tree, for delivering a message to terminal destination devices simultaneously, according to an example embodiment.

FIG. 5 illustrates an example method by the deterministic multicast process 248 of the PCE 102 of FIG. 1 establishing deterministic multicast paths for delivering a message to terminal destination device simultaneously, according to an example embodiment. The deterministic multicast process 248 of the PCE 102 establishes deterministic multicast paths based on identifying multicast paths in the multicast forwarding tree 400 for reaching each of the terminal destination devices 412, and establishing a schedule for each of the multicast paths.

Hence, the deterministic multicast process 248 of the PCE 102 enables scheduling of a message (i.e., a data packet) in the multicast forwarding tree 400 of deterministic network 100, where the scheduling of the root node 410 and the forwarding network devices 414 ensures that the message output by the root 410 is delivered to each terminal destination device 412 at same arrival time.

The processor circuit 220 of the PCE 102 is configured for identifying the multicast forwarding tree 400 in operation 500 based on execution of the deterministic multicast process 248, for example based on identifying the terminal destination devices 412 requiring delivery of the message from the root node 410. The identifying in operation 500 can include identifying the terminal destination devices 412, the root node 410 outputting the message, and the forwarding network devices 414 forwarding the message to the terminal destination devices 412.

The deterministic multicast process 248 executed by the processor circuit 220 of the PCE 102 (i.e., the process 248 executed in the PCE 102) in operation 500 also identifies in operation 500 the multicast paths in the multicast forwarding tree 400 for reaching each terminal destination device 412. For example, the process 248 executed in the PCE 102 can identify the multicast path for reaching the terminal destination device "N21" 412 as "R-N11", the multicast path for reaching the terminal destination device "N31" 412 as "R-N11-N22", the multicast path for reaching the terminal destination device "N32" 412 as "R-N12-N23", the multicast path for reaching the terminal destination devices "N41" and "N42" 412 as "R-N12-N23-N33", and the multicast path for reaching the terminal destination devices "N24", "N25", and "N26" as "R-N13".

The process 248 executed in the PCE 102 in operation 500 also can identify, for each forwarding network device 414 and the root node 410, the corresponding available buffer capacity 422 for storage (buffering) of the message prior to delivery to each terminal destination device 412.

The process 248 executed in the PCE 102 in operation 502 generates a multicast routing graph of transmission schedules for the root node 410 and each forwarding network device 414, relative to the corresponding available buffer capacity 422. The multicast routing graph represents the collection of all deterministic multicast paths for reaching the terminal destination devices, where each deterministic multicast path for a given terminal destination device 412 includes the multicast path for reaching the terminal destination device, and the corresponding schedule for transmitting the message along each hop of the multicast path.

A set of initial starting conditions/assumptions 600 by the process 248 executed in the PCE 102 for the multicast forwarding tree 400 shown in FIG. 4 is shown in FIG. 6, in various embodiments. The process 248 executed in the PCE 102 uses the starting conditions 600 for generating the multicast routing graph in operation 502. As shown, assume that a message is to be sent by the root/multicast source 400 at a time $t=t_0$ and must be delivered to the destinations/terminal nodes at time $t=t_A$. For any given node i, let $P^i$ be the parent of node i and $C^i$ be the forwarding children of node i. For purposes of clarity, assume that a packet transmission between two adjacent nodes always takes the same amount of time $tr_0$ (otherwise $tr_{ij}$ can be used as the travel time between node i to node j).

The starting conditions 600 can include the following parameters: $t_0$=current time on root; $t_A$=prescribed target arrival time; i=current node under analysis; $P^i$=parent of node i; $C^i$=forwarding children of node i; $u=t_a(i)$=arrival time at node i; $v=t_d(i)$=departure time from node i; $v_k=t_d(i, k)$=departure time from node i to node k, i.e., difference in departure time between nodes i and k $(t_d(k)-t_d(i))$; $tr_0$=travel time on one segment (including all transmission delays, assuming any two adjacent nodes have equal $tr_0$, else use $tr_{ij}$ as travel time from i to j; and $b_i[u,v]$=number of free buffers at node I during time interval [u,v].

Two different approaches are disclosed in operation 502, to ensure that the multicast transmission reaches the destinations/terminal nodes at the same time. The primary goal of both approaches is to minimize the number of transmissions throughout the multicast forwarding tree 400 while resolving buffering shortage on any given node by buffering at nodes that have resources left. However, the approaches differ in the strategies they apply to pick up the transmission time, which lead to a different buffering distribution, and eventually to a different number of transmissions.

As illustrated in FIG. 5, the process 248 executed in the PCE 102 can generate in operation 502a a multicast routing graph that specifies a "downstream" buffering for execution by the forwarding network devices 414, where the "downstream" buffering maximizes buffering of the message in the penultimate nodes 420, relative to the available buffer capacity 422 in the penultimate nodes 420. The "downstream" buffering enables each penultimate node to store the message as long as necessary until the prescribed arrival time.

Figure 7:
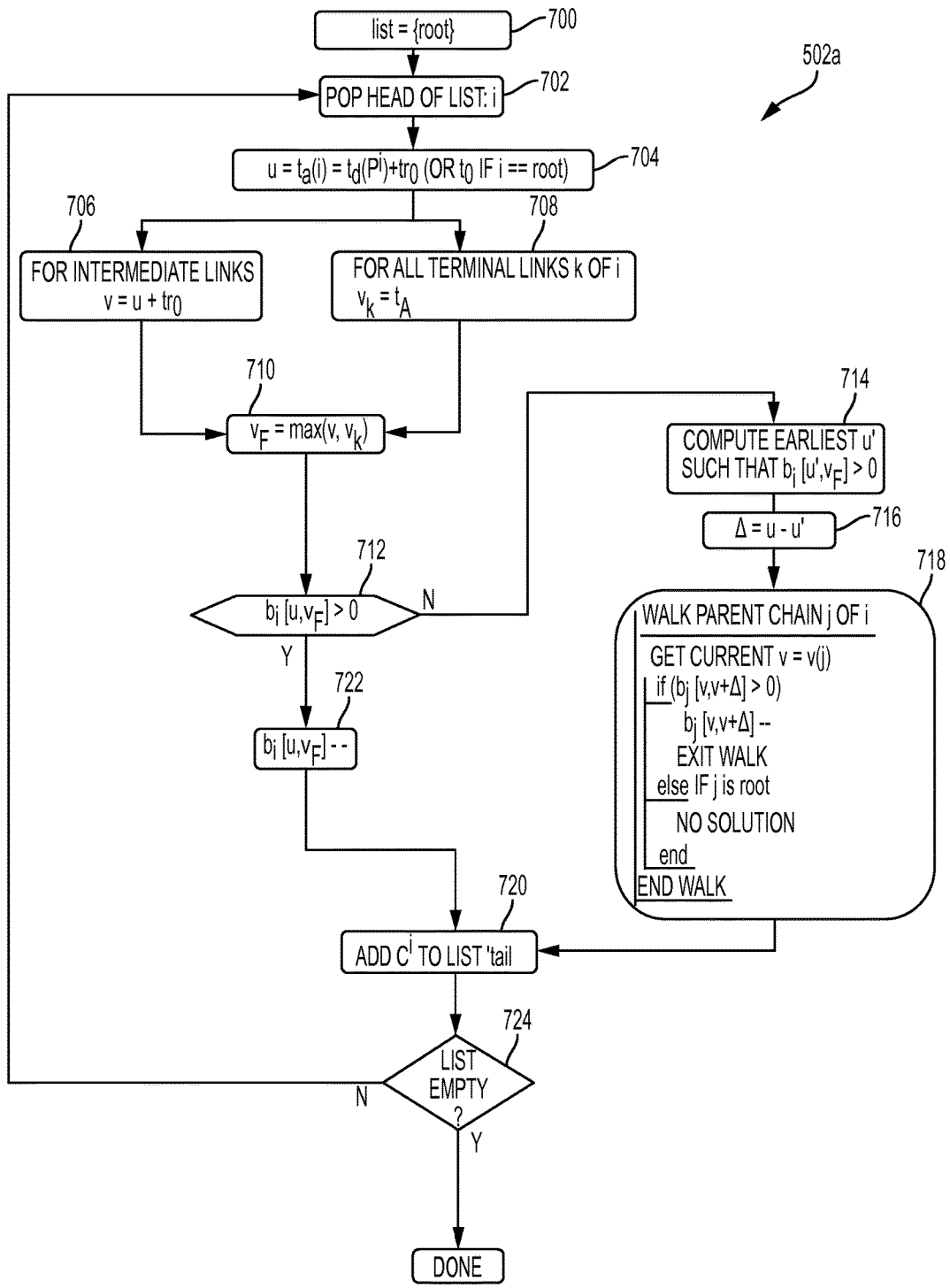
FIG. 7 illustrates an example flow diagram for providing downstream buffering in a deterministic multicast forwarding tree, according to an example embodiment.

FIG. 7 illustrates an example of the downstream scheduling 502a executed by the process 248 executed in the PCE 102, according to an example embodiment. In this approach, the multicast message is sent by a node "N" (e.g., any node belonging to the multicast forwarding tree) as soon as it arrives, unless the next node is a termination/destination node (in this case, N is a penultimate node). When that is the case, the message is buffered by node N until time=$t_A-tr_0$. If any node N on the path from the multicast source 410 to a leaf 412 does not have enough resource to buffer the message (buffering on any node but penultimate requires a buffer for duration $tr_0$, while on penultimate, it could require a buffer for as long as $t_A-tr_0$), the earliest time T that the message can be buffered by N may be computed and then walk its parent chain to identify a parent that could buffer the message so that it reach node N at T.

As illustrated in FIG. 7, the process 248 executed in the PCE 102 starts with a list of the network devices in the multicast forwarding tree 400 and recursively determines the schedule for the root node 410 and each forwarding network device 414, starting with the available buffer capacity 422 in operation 700. The process 248 in the PCE 102 pops the list in operation 702, to start with the first forwarding network device 414 as node i: the process 248 executed in the PCE 102 determines the arrival time $t_a(i)$ at node i at operation 704 based on the departure time $t_d(P^i)$ from i's parent $P^i$ plus the travel time $tr_0$ on the segment 418 between the parent $P^i$ and its child node i. The process 248 executed in the PCE 102 in operation 706 determines the departure time at node i for intermediate links 418, and in operation 708 the departure time for terminal links 416, and sets the maximum departure time $v_F$ in operation 710. If in operation 712 there is sufficient available buffer capacity 422, the process 248 executed in the PCE 102 in operation 722 can reduce the free buffer count from the available buffer capacity 422 of the node i and continue to operation 720, described below.

If in operation 712 the process 248 executed in the PCE 102 determines the node i does not have sufficient available buffer capacity 422 for the maximum departure time $v_F$, the process 248 executed in the PCE 102 in operation 714 finds a parent device (e.g., "N12" for node "N23") having sufficient available buffer capacity 422 (i.e., a free-space parent). The process 248 executed in the PCE 102 in operation 716 determines the arrival time difference between the node i and its free-space parent, and schedules in operation 718 the arrival time for the free-space parent relative to the node i, and allocates the available buffer capacity 422 for the free-space parent: if the allocation results in the free-space parent losing its available buffer capacity 422, process 248 executed in the PCE 102 can successively schedule the message upwards toward the root 410, in a chain of forwarding network devices (containing the penultimate node and the parent node), until identifying a forwarding network device 414 having the available buffer capacity 422. The children nodes of the node i are added in operation 720 to the list of nodes need to allocate buffers and establish a transmission schedule in the list. The operations in FIG. 7 are repeated in operation 724 for the next node in the list, until all the forwarding nodes 414 have been scheduled for forwarding the multicast message to a terminal destination device 412.

There are some cases in which the approach shown in FIG. 7 will not find a solution. For instance, some leaves may not be reachable in time. In another example, the forwarding chain may not have enough buffering capability to delay a message so that it does not reach some leaves too early.

While the "downstream buffering" approach may be suitable in some deployments, it also may be rapidly limited. Notably, the downstream buffering approach may be sub-optimal in some cases in that it may potentially limit the number of simultaneous flows that the network can handle. For example, consider a symmetrical tree having one root, two children (penultimate), and two leaves on each. In such a tree, the "downstream buffering" approach would lead to storing the message on each penultimate node, hence consuming two buffers, while it could have been stored on the root, consuming only one buffer.

Hence, the process 248 executed in the PCE 102 can generate in operation 502b of FIG. 5 a multicast routing graph that specifies an "upstream" buffering for execution by the forwarding network devices 414, where the "upstream" buffering minimizes buffering of the message in the penultimate nodes 420 and maximizes buffering of the message in parent nodes (e.g., "N11" for "N22"; "N12" for "N23" and/or "N33") closest to the root 410: the "upstream" buffering enables the delay of transmission through the multicast forwarding tree 400 as long as possible.

Figure 8:
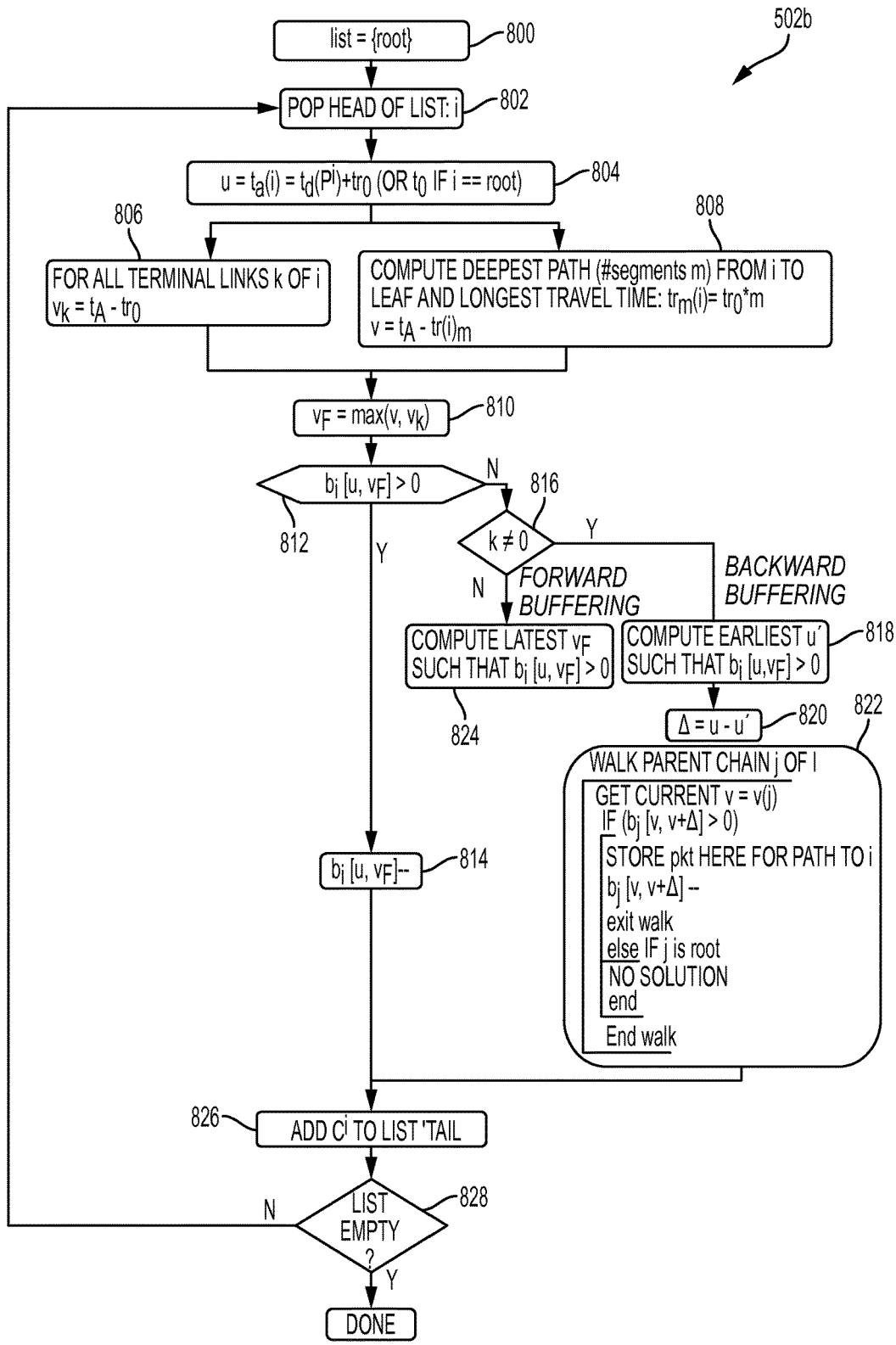
FIG. 8 illustrates an example flow diagram for providing upstream buffering in a deterministic multicast forwarding tree, according to an example embodiment.

FIG. 8 illustrates an example of the downstream scheduling 502b executed by the process 248 executed in the PCE 102, according to an example embodiment. In the "upstream buffering" approach, similar to the "downstream buffering" approach, one objective may be to limit the number of transmission. Each forwarding node may initially try to transmit a packet only once (multicast to all children, according to the multicast forwarding tree). But, as a secondary goal, forwarding nodes may also try to hold the message as long as possible, so that messages are stored as high as possible in the multicast forwarding tree 400. This guarantees that buffers consumption within the tree is minimized, and buffers are consumed as high as possible in the tree, where nodes are likely to have more resources.

As shown in FIG. 8, the general operation in the "upstream buffering" approach is to calculate at each node the longest path to farthest destination, and replicate the messages to its children "just in time" so that the messages will reach this destination at time=$t_A$. At penultimate nodes, messages are held until time=$t_A-tr_0$. As in the "downstream buffering" approach, if any node has a buffer shortage, the message is stored in the parent chain.

The process 248 executed in the PCE 102 executes operations 800, 802, and 804 the same as operations 700, 702, and 704, respectively. The process 248 executed in the PCE 102 in operation 806 determines, for all terminal links 416 "k" of the node i the departure time $v_k$, and in operation 808 determines the deepest path and latest time needed to store the message at node i for arrival at the furthest terminal destination device 412 at the prescribed target arrival time $t_A$. The process 248 executed in the PCE 102 sets the maximum time $v_F$ in operation 810, and determines in operation 812 whether the node i has available buffer capacity 422 for storing the message for the maximum time $v_F$. If the available buffer capacity 422 is greater than zero in operation 812, the process 248 executed in the PCE 102 in operation 814 schedules the node i and allocates from its available buffer capacity 422 a buffer for storing the message.

If in operation 812 the process 248 executed in the PCE 102 determines there is no sufficient buffer capacity, the process 248 executed in the PCE 102 determines in operation 816 if the node i is a penultimate node 410 (i.e., whether it has any terminal links 416); assuming in operation 816 the node i is a penultimate node 420, the process 248 executed in the PCE 102 can execute "backward buffering" in operations 818, 820, and 820, as described previously with respect to operations 714, 716, and 718, respectively, to schedule the message in a parent network device in the chain between the node i and the root 410. The process 248 executed in the PCE 102 in operation 816 can add the children of the node i for analysis in operation 824, as described previously with respect to operation 720.

If in operation 816 the node i is not a penultimate node 420 and has one or more terminal links "k" 416 to a terminal destination device 412, the process 248 executed in the PCE 102 in operation 824 can execute "forward buffering", where a second forwarding device downwards from the node i and toward the terminal destination device 412 (i.e., a "child" forwarding network device of node i) can be scheduled with buffering the message: the process 248 executed in the PCE 102 calculates in operation 824 the latest departure time $v_F$ from a child forwarding network device having a free available buffer capacity 422, and schedules the child forwarding network device for transmission at the latest departure time $v_k$. The available buffer capacity 422 is reduced by the process 248 executed in the PCE 102 based on the queued message in operation 814.

The process 248 executed in the PCE 102 executes operations 826 and 828 in the same manner as operations of 720 and 722, respectively, to ensure all forwarding network devices 414 in the list have been scheduled, based on the available buffer capacity 422, to ensure each terminal destination device 412 receives the message at the same prescribed target arrival time $t_A$.

Referring to FIG. 5, the process 248 executed in the PCE 102 in operation 506 can download schedule instructions to the forwarding network devices 414 based on the multicast routing graph generated in operation 502. In particular, the network interface circuit 210 of the PCE 102 can output instructions, generated by the processor circuit 220 executing the process 248 executed in the PCE 102, for a corresponding schedule for forwarding the message (relative to receipt thereof) relative to the multicast routing graph. The schedule can specify instructions for multiple transmissions by a forwarding network device 414. For example, the schedule output by the PCE 102 can specify instructions for an identified forwarding network device (e.g., "N23") 414 to forward the message to an identified child terminal node (e.g., "N32") 412 at the prescribed penultimate departure time "$v_k=t_A-tr_0$" for delivery at target arrival time $t_A$, and second instructions to forward the message to an identified child forwarding network device (e.g., "N33") 414 at an earlier departure time "$v_{N23-N33}=t_A-2tr_0$". Hence, the schedules sent to each of the forwarding network devices 414 enable the forwarding network devices 414 in operation 508 to implement the multicast routing graph generated in operation 502, where each of the forwarding network devices 414 can cause the penultimate nodes 420 to deliver the message to each of the terminal destination devices 412 at the same prescribed target arrival time $t_A$.

The techniques described herein, therefore, provide for various approaches that ensure the simultaneous delivery of multicast messages to different devices/destinations. In one approach, buffer utilization by the various nodes may be optimized, thereby allowing more flows to be processed by the network at any given time. In particular, when extra buffering becomes necessary, this may lead to extra transmissions, which may be problematic in a deterministic network.

As would be appreciated, the techniques herein also differ from other approaches (e.g., 802.1AVB, etc.) that attempt to synchronize the edges of the network and stage the packets at the last switch, to deliver a same packet to multiple devices at the same time. In the context of IoT networks, however, such field devices may not have the needed buffering capacity to implement such techniques. With the emergence of fully scheduled deterministic networks (e.g., TTTech, 802.1TSN, etc.), an SDN controller can precisely compute where and when a packet will be in the network. To do so, this new technology adds two critical properties: 1.) nailed down paths, and 2.) precise timing of transmission along those paths.

One critical remark regarding the techniques herein is that once a network is fully scheduled, it becomes possible to offload the staging of a packet from the edge node to further inside the network, when a buffer is effectively available. In a legacy/non-deterministic network, this was impossible. In addition, if a packet is multicast, the overall number of allocated buffers in the network is minimized if the packets are staged before the multicast forwarding tree forks as opposed to after, since the forking creates multiple copies. A non-IoT solution also may be content with staging packets as long as possible as early as possible along the tree so as to minimize the number of staging buffers in the network. However, the very constrained nature of IoT devices makes doing so impractical because, soon enough, it may overload the few buffers in the common parent. The challenge is thus to keep staging as high as possible in the trees but yet within constrained buffer capacity, and thus push the extra traffic down the multicast forwarding trees.

While there have been shown and described illustrative embodiments, it is to be understood that various other adaptations and modifications may be made within the spirit and scope of the embodiments herein. For example, the embodiments have been shown and described herein with relation to wireless or PLC networks. However, the embodiments in their broader sense are not as limited, and may, in fact, be used with other types of shared-media networks and/or protocol. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

Each apparatus 102, 104, 106, 108, 200, 410, 412, 414, 414 is a physical machine (i.e., a hardware device) configured for implementing network communications with other physical machines via the networks disclosed herein. The term "configured for" or "configured to" as used herein with respect to a specified operation refers to a device and/or machine that is physically constructed and arranged to perform the specified operation.

As described previously with respect to FIG. 2, any one of the devices 102, 104, 106, 108, 200, 410, 412, 414, or 414 can include a network interface circuit 210, a processor circuit 220, and a memory circuit 240. The network interface circuit 210 can include one or more distinct physical layer transceivers for communication with any one of the other devices 102, 104, 106, 108, 200, 410, 412, 414, or 414; the network interface circuit 210 also can include an IEEE based Ethernet transceiver for communications with the devices of FIG. 1 via any of the links 105, 416 or 418 (e.g., a wired or wireless link, an optical link, etc.). The processor circuit 220 can be configured for executing any of the operations described herein, and the memory circuit 240 can be configured for storing any data or data packets as described herein.

Any of the disclosed circuits of the devices 102, 104, 106, 108, 200, 410, 412, 414, or 414 (including the network interface circuit 210, the processor circuit 220, the memory circuit 240, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 240) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 240 can be implemented, for example, using a nonvolatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 240 can be implemented dynamically by the processor circuit 220, for example based on memory address assignment and partitioning executed by the processor circuit 220.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   identifying, by an apparatus in a deterministic network, a multicast forwarding tree comprising a single multicast source as a root of the multicast forwarding tree, a plurality of terminal destination devices as respective leaves of the multicast forwarding tree, and forwarding network devices configured for forwarding a message, transmitted by the root, to the terminal destination devices, the multicast forwarding tree including a first multicast path for the message reaching a first of the terminal destination devices and a second multicast path for the message reaching a second of the terminal destination devices, wherein the first multicast path has a first distance from the root to the first terminal destination device and the second multicast path has a second different distance from the root to the second terminal destination device; and
   causing, by the apparatus, the forwarding network devices to deliver the message to each of the terminal destination devices, including the first terminal destination device and the second terminal destination device, simultaneously at a same arrival time, guaranteeing both the first terminal destination device and the second terminal destination device receive the message simultaneously at the same arrival time, the causing including scheduling for each forwarding network device a corresponding departure time for transmitting the message to a next-hop device in the multicast forwarding tree.

2. The method of claim 1, wherein the causing includes generating a multicast routing graph identifying transmission schedules identifying the respective departure times relative to buffer capacity in the forwarding network devices.

3. The method of claim 2, wherein the causing includes downloading, to each of the forwarding network devices, a corresponding schedule identifying the corresponding departure time for forwarding the message relative to receipt thereof based on the multicast routing graph, the schedules enabling the forwarding network devices to deliver the message to each of the terminal destination devices simultaneously at the same time.

4. The method of claim 1, wherein:
   the forwarding network devices include penultimate nodes configured for delivering the message to the terminal destination devices simultaneously at the same time via respective terminal links;
   the causing includes maximizing buffering of the message in each of the penultimate nodes, relative to a buffer capacity in the corresponding penultimate node.

5. The method of claim 4, wherein:
   the forwarding network devices further include a parent node for one or more of the penultimate nodes;
   the maximizing buffering includes scheduling buffering of the message in the parent node based on a determined unavailability of the corresponding buffer capacity in the one penultimate node.

6. The method of claim 5, further comprising scheduling the message successively upwards toward the root, in a chain of forwarding network devices containing the one penultimate node and the parent node, until identification of one of the forwarding network devices having a corresponding available buffer capacity.

7. The method of claim 1, wherein:
   the forwarding network devices include penultimate nodes configured for delivering the message to the terminal destination devices simultaneously at the same time via respective terminal links, and one or more parent nodes configured for providing the message to one or more of the penultimate nodes;
   the causing includes minimizing buffering of the message in the penultimate nodes and maximizing buffering in the one or more parent nodes, relative to a buffer capacity in the one or more parent nodes.

8. The method of claim 7, wherein the causing includes at least one of:
   scheduling buffering of the message upwards toward the root based on a determined unavailability of the corresponding buffer capacity in the one or more parent nodes; or
   scheduling buffering of the message downwards in a second forwarding network device toward one or more of the terminal destination devices, based on a determined availability of the corresponding buffer capacity in the second forwarding network device.

9. An apparatus comprising:
   a processor circuit configured for identifying, in a deterministic network, a multicast forwarding tree comprising a single multicast source as a root of the multicast forwarding tree, a plurality of terminal destination devices as respective leaves of the multicast forwarding tree, and forwarding network devices configured for forwarding a message, transmitted by the root, to the terminal destination devices, the multicast forwarding tree including a first multicast path for the message reaching a first of the terminal destination devices and a second multicast path for the message reaching a second of the terminal destination devices, wherein the first multicast path has a first distance from the root to the first terminal destination device and the second multicast path has a second different distance from the root to the second terminal destination device, the processor circuit further configured for generating instructions causing the forwarding network devices to deliver the message to each of the terminal destination devices simultaneously at a same arrival time based on scheduling for each forwarding network device a corresponding departure time for transmitting the message to a next-hop device in the multicast forwarding tree; and
   an interface circuit configured for sending, to the forwarding network devices, the instructions causing the forwarding network devices to deliver the message to each of the terminal destination devices, including the first terminal destination device and the second terminal destination device, simultaneously at a same arrival time, guaranteeing both the first terminal destination device and the second terminal destination device receive the message simultaneously at the same arrival time.

10. The apparatus of claim 9, wherein the processor circuit is configured for generating a multicast routing graph identifying transmission schedules identifying the respective departure times relative to buffer capacity in the forwarding network devices.

11. The apparatus of claim 10, wherein the instructions specify, for each of the forwarding network devices, a corresponding schedule identifying the corresponding departure time for forwarding the message relative to receipt thereof based on the multicast routing graph, the schedules enabling the forwarding network devices to deliver the message to each of the terminal destination devices simultaneously at the same time.

12. The apparatus of claim 9, wherein:
the forwarding network devices include penultimate nodes configured for delivering the message to the terminal destination devices simultaneously at the same time via respective terminal links;
the processor circuit is configured for maximizing buffering of the message in each of the penultimate nodes, relative to a buffer capacity in the corresponding penultimate node.

13. The apparatus of claim 12, wherein:
the forwarding network devices further include a parent node for one or more of the penultimate nodes;
the processor circuit is configured for maximizing buffering based on scheduling buffering of the message in the parent node based on a determined unavailability of the corresponding buffer capacity in the one penultimate node.

14. The apparatus of claim 13, wherein the processor circuit is configured for scheduling the message successively upwards toward the root, in a chain of forwarding network devices containing the one penultimate node and the parent node, until identification of one of the forwarding network devices having a corresponding available buffer capacity.

15. The apparatus of claim 9, wherein:
the forwarding network devices include penultimate nodes configured for delivering the message to the terminal destination devices simultaneously at the same time via respective terminal links, and one or more parent nodes configured for providing the message to one or more of the penultimate nodes;
the processor circuit is configured for minimizing buffering of the message in the penultimate nodes and maximizing buffering in the one or more parent nodes, relative to a buffer capacity in the one or more parent nodes.

16. The apparatus of claim 15, wherein the processor circuit is configured for at least one of:
scheduling buffering of the message upwards toward the root based on a determined unavailability of the corresponding buffer capacity in the one or more parent nodes; or
scheduling buffering of the message downwards in a second forwarding network device toward one or more of the terminal destination devices, based on a determined availability of the corresponding buffer capacity in the second forwarding network device.

17. One or more non-transitory tangible media encoded with logic for execution by a machine and when executed by the machine operable for:
identifying, by the machine implemented as an apparatus in a deterministic network, a multicast forwarding tree comprising a single multicast source as a root of the multicast forwarding tree, a plurality of terminal destination devices as respective leaves of the multicast forwarding tree, and forwarding network devices configured for forwarding a message, transmitted by the root, to the terminal destination devices, the multicast forwarding tree including a first multicast path for the message reaching a first of the terminal destination devices and a second multicast path for the message reaching a second of the terminal destination devices, wherein the first multicast path has a first distance from the root to the first terminal destination device and the second multicast path has a second different distance from the root to the second terminal destination device; and
causing, by the apparatus, the forwarding network devices to deliver the message to each of the terminal destination devices, including the first terminal destination device and the second terminal destination device, simultaneously at a same arrival time, guaranteeing both the first terminal destination device and the second terminal destination device receive the message simultaneously at the same arrival time, the causing including scheduling for each forwarding network device a corresponding departure time for transmitting the message to a next-hop device in the multicast forwarding tree.

18. The non-transitory tangible media of claim 17, wherein:
the forwarding network devices include penultimate nodes configured for delivering the message to the terminal destination devices simultaneously at the same time via respective terminal links;
the causing includes maximizing buffering of the message in each of the penultimate nodes, relative to a buffer capacity in the corresponding penultimate node.

19. The non-transitory tangible media of claim 18, wherein:
the forwarding network devices further include a parent node for one or more of the penultimate nodes;
the maximizing buffering includes scheduling buffering of the message in the parent node based on a determined unavailability of the corresponding buffer capacity in the one penultimate node.

20. The non-transitory tangible media of claim 17, wherein:
the forwarding network devices include penultimate nodes configured for delivering the message to the terminal destination devices simultaneously at the same time via respective terminal links, and one or more parent nodes configured for providing the message to one or more of the penultimate nodes;
the causing includes minimizing buffering of the message in the penultimate nodes and maximizing buffering in the one or more parent nodes, relative to a buffer capacity in the one or more parent nodes.

* * * * *